(12) United States Patent
Feng et al.

(10) Patent No.: US 9,075,839 B2
(45) Date of Patent: Jul. 7, 2015

(54) METHOD, APPARATUS AND DATABASE SYSTEM FOR RESTORING TENANT DATA IN A MULTI-TENANT ENVIRONMENT

(75) Inventors: Chen Hua Feng, Beijing (CN); Kai Tang, Beijing (CN); Yun Tao Wang, Yunnan (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 13/423,593

(22) Filed: Mar. 19, 2012

(65) Prior Publication Data

US 2012/0246118 A1 Sep. 27, 2012

(30) Foreign Application Priority Data

Mar. 25, 2011 (CN) .......................... 2011 1 0073645

(51) Int. Cl.
*G06F 17/30* (2006.01)
*G06F 11/14* (2006.01)

(52) U.S. Cl.
CPC ...... *G06F 17/30348* (2013.01); *G06F 11/1446* (2013.01); *G06F 11/1471* (2013.01); *G06F 2201/80* (2013.01)

(58) Field of Classification Search
USPC ................................................ 707/679, 684
See application file for complete search history.

(56) References Cited

U.S. PATENT DOCUMENTS

| | | | |
|---|---|---|---|
| 6,192,378 B1 * | 2/2001 | Abrams et al. ....................... 1/1 |
| 7,587,435 B2 | 9/2009 | Shepherd | |
| 7,739,244 B2 | 6/2010 | Verma et al. | |
| 2004/0267835 A1 * | 12/2004 | Zwilling et al. ............... 707/202 |
| 2005/0097149 A1 * | 5/2005 | Vaitzblit et al. ............... 707/202 |
| 2007/0233753 A1 * | 10/2007 | Taniguchi et al. ............. 707/202 |
| 2009/0327311 A1 * | 12/2009 | Becker ............................. 707/10 |
| 2010/0138830 A1 * | 6/2010 | Astete et al. ...................... 718/1 |
| 2010/0198730 A1 | 8/2010 | Ahmed et al. | |
| 2010/0211548 A1 * | 8/2010 | Ott et al. ....................... 707/655 |
| 2010/0318812 A1 | 12/2010 | Auradkar et al. | |

(Continued)

FOREIGN PATENT DOCUMENTS

| | | |
|---|---|---|
| CN | 91955967 A | 5/2007 |
| CN | 101593185 A | 12/2009 |
| EP | 1630674 A1 | 3/2006 |
| WO | WO 2009/124390 | 10/2009 |

OTHER PUBLICATIONS

Article entitled "OpenEdge Roadmap", by Cicciari, dated Mar. 18, 2011.*

(Continued)

*Primary Examiner* — Mahesh Dwivedi
(74) *Attorney, Agent, or Firm* — Alexander Jochym

(57) ABSTRACT

A method, apparatus and database system restore tenant data in a multi-tenant environment. The method comprises: logging a plurality of tenants' requests to the database; with respect to a particular tenant who requires restoring tenant data, acquiring a log of events which affect contents of the database and start from a particular backup point; and only restoring in the database data of the particular tenant to the particular backup point, according to the acquired log of events. When a tenant performs a wrong operation on the database and wishes to roll back to a backup point, only information of the particular tenant in the database is changed into the information at the backup point, without affecting other tenants.

4 Claims, 5 Drawing Sheets

(56) References Cited

U.S. PATENT DOCUMENTS

2011/0191299 A1* 8/2011 Huynh Huu et al. ......... 707/646
2011/0289047 A1* 11/2011 Ahuja ........................... 707/609
2011/0307450 A1* 12/2011 Hahn et al. .................... 707/649
2012/0173488 A1* 7/2012 Spielberg et al. ............. 707/639
2012/0179646 A1* 7/2012 Hinton et al. ................. 707/607
2012/0204030 A1* 8/2012 Nossik et al. ................. 713/168
2012/0254118 A1* 10/2012 Shah et al. .................... 707/645

OTHER PUBLICATIONS

Rochwerger et al., The Reservoir Model and Architecture for Open Federated Cloud Computing, IBM Journal of Research and Development, Jul. 2009, pp. 1-17, vol. 53 Issue 4.

* cited by examiner

METHOD, APPARATUS AND DATABASE SYSTEM FOR RESTORING TENANT DATA IN A MULTI-TENANT ENVIRONMENT

CROSS REFERENCE TO RELATED APPLICATION

This application claims priority under 35 U.S.C. §119 from Chinese Patent Application No. 201110073645.4 filed Mar. 25, 2011, the entire contents of which are incorporated herein by reference.

TECHNICAL FIELD

The present invention generally relates to cloud computing, and more specifically to a method, apparatus and database system for restoring tenant data in a multi-tenant environment.

BACKGROUND

At present, in the cloud computing environment, most Software as a Service (SaaS) applications support multi-tenancy. For example, many enterprises use email service from one service provider via the Internet or worldwide web. Each of the enterprises uses the same interface for filling out authentication information such as an enterprise ID and password when logging onto the website, and accepts the same service process, but information for each enterprise is isolated. An enterprise cannot see the information of others. Here, each enterprise is a tenant. A tenant comprises a plurality of personal accounts, including personal accounts of administrators and common employees.

Currently, information of the tenants is isolated from each other primarily through three approaches. The first approach is to use separate servers for different tenants. The second approach is to use a plurality of databases on the same server for different tenants. The above two approaches are suitable for those tenants whose amount of information to be maintained is comparatively large. For those tenants whose amount of information to be maintained is comparatively small, a third approach is often adopted, that is, information of multiple tenants is maintained in the same database but isolated inside the database in a table level. For example, the database has a plurality of tables, and each of them is shared by a plurality of tenants.

FIG. 1 is a block diagram of a database system 400 in the prior art. The database system 400 comprises a database management system ("DBMS") 402 and a database 403. In addition, the database 403 has an automatic data event logging mechanism, i.e., data event logger 404. When a tenant wishes to perform a query, insertion, deletion or update on records in the database 403 (in fact on records in the tables database 403, which are hereinafter referred to as records in the database), an application 401 sends a SQL request to the database management system 402. The database management system 402 performs the query, insertion, deletion or update on the database 403, according to the request. If the request is a query request, the query result is then returned to the application 401. When the contents of the database 403 are changed (that is, the request is an insertion, deletion or update request), the data event logger 404 automatically logs the change as an event. Specifically, when the change is an insertion, a newly inserted record is logged; when the change is a deletion, a deleted record is logged; when the change is an update, records before the update and after the update are logged both.

In the case of isolation inside database, in order to reduce information loss caused by database failure or effects of a tenant's wrong operation on the database, a backup database is provided and keeps the content synchronized with the original database at backup points periodically. However, a great shortcoming of the prior art is that once a tenant performs a wrong operation on the database and thus wishes to roll back to a backup point, all the tenants data in the database must roll back to the backup point simultaneously, thereby affecting other tenants.

FIG. 2 shows two backup points, A and B. When the tenant A finds at the current time that a wrong operation was performed on the database and thus wishes to roll back to the backup point B, a restoration operation has to be performed not only on data of the tenant A but also simultaneously on data of tenants B and C—who do not wish to roll back to the backup point B.

SUMMARY OF THE INVENTION

A preferred aspect of the disclosed subject matter aims to solve a problem that, when a tenant performs a wrong operation on the database and wishes to roll back to a backup point, only information of the particular tenant in the database is changed into the information at the backup point, without affecting other tenants.

According to a first aspect of the invention, a method of restoring tenant data in a multi-tenant environment is provided, comprising: logging a plurality of tenants' requests to the database; with respect to a particular tenant who requires restoring tenant data, acquiring a log of events which affect contents of the database and start from a particular backup point; and only restoring, in the database, data of the particular tenant to the particular backup point, according to the acquired log of events.

According to a second aspect of the invention, an apparatus for restoring tenant data in a multi-tenant environment is provided, comprising: logging means configured to log a plurality of tenants' requests to the database; acquiring means configured to acquire, with respect to a particular tenant who requires restoring tenant data, a log of events which affect contents of the database and start from a particular backup point; and restoring means configured to only restore, in the database, data of the particular tenant to the particular backup point, according to the acquired log of events.

According to a third aspect of the invention, a database system is provided, comprising: a database; a database management system; and an apparatus for restoring tenant data in a multi-tenant environment according to the second aspect.

An advantageous effect brought by an aspect of the invention is that, when a certain tenant performs a wrong operation on the database and wishes to roll back to a backup point, only information of this tenant in the database is changed into the information at the backup point, without affecting other tenants.

Another advantageous effect brought by an aspect of the invention is that, information of a tenant in the database is changed into the information at the backup point, without the need of modifying the original mechanism (for example, the database management system 402 and the database 403), which is a non-intrusive mechanism.

BRIEF DESCRIPTION OF THE DRAWINGS

The drawings referenced in the present application are only used to exemplify typical embodiments of the present invention and should not be considered to be limiting the scope of the present invention.

DETAILED DESCRIPTION OF PREFERRED EMBODIMENTS

In the following discussion, a great amount of concrete details are provided to help thoroughly understand the present invention. However, it is apparent to those of ordinary skill in the art that even if there were no such concrete details, the understanding of the present invention would not be influenced. In addition, it should be further appreciated that any specific terms used below are only for the convenience of description, and thus the present invention should not be limited only to use in any specific applications represented and/or implied by such terms.

The principle of the invention is discussed first. Firstly, among the tenant's operations on the database, not all the operations will affect the contents of the database. Only the three operations of insertion, deletion and update will affect the contents of the database. In addition, a SQL request issued by a tenant and sent to the database contains information of the tenant. Therefore, all the SQL requests starting from the backup point completely can be logged before the SQL requests enter the database management system 402. Once a tenant performs a wrong operation on the database 403 and needs to roll back to a backup point, SQL requests of the tenant can be extracted according to the tenant information contained in the logged SQL requests, and a log of events which affect the contents of the database and start from the backup point can be acquired. According to the log of events only particular to the tenant, by applying a reverse operation or the like, only the data of the tenant can be restored in the database without affecting other tenants.

Figure 1:
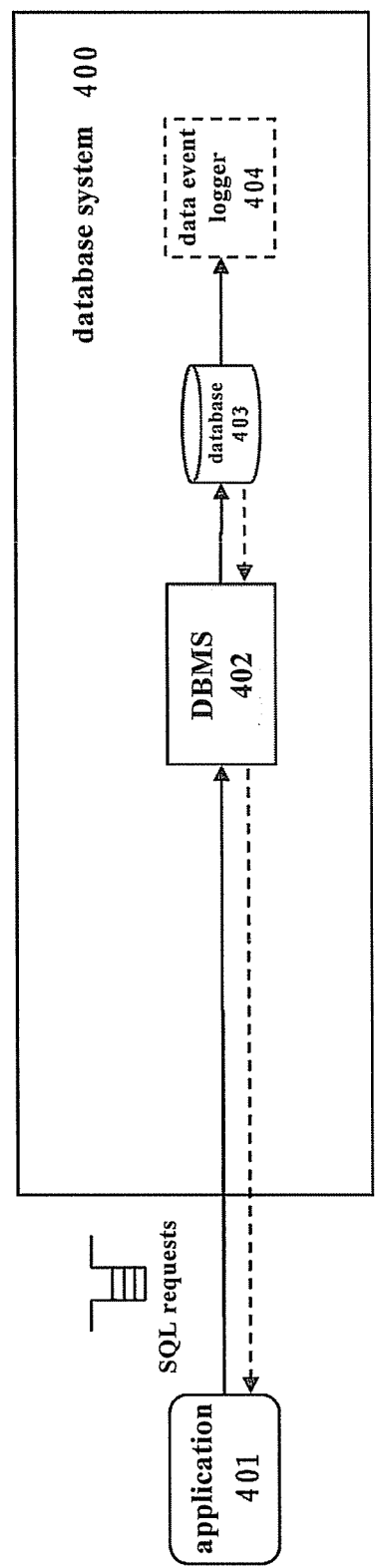
FIG. 1 is a block diagram showing a database system in the prior art.
Figure 2:
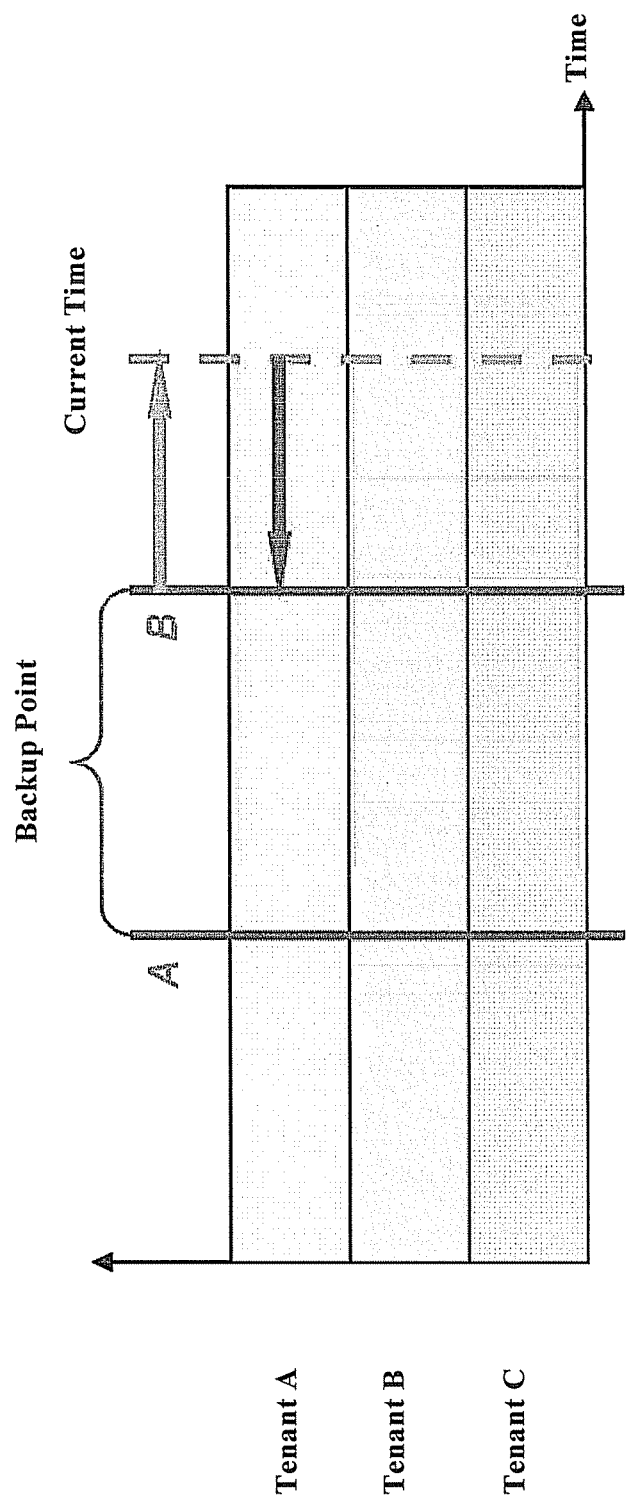
FIG. 2 shows an example in which a tenant A wishes to roll back to a backup point and tenants B and C do not wish to roll back to the backup point.
Figure 3:
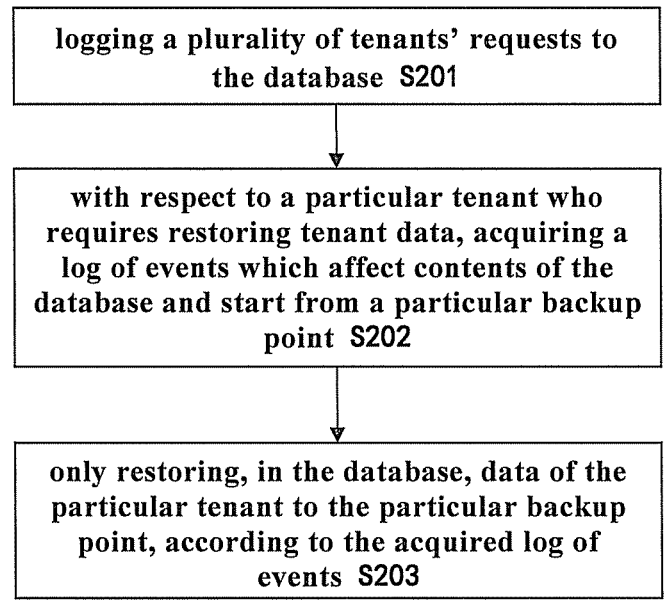
FIG. 3 is a flow chart showing a method of restoring tenant data in a multi-tenant environment according to an aspect of the invention.

FIG. 3 is a flow chart showing a method of restoring tenant data in a multi-tenant environment in a shared data table mode according to aspects of the subject disclosure. In step S201, all tenants' requests to the database are logged. In step S202, with respect to a particular tenant who requires restoring tenant data, acquiring a log of events which affect contents of the database and start from a particular backup point. In step S203, data of only the particular tenant in the database is restored to the particular backup point, according to the acquired log of events.

Figure 4:
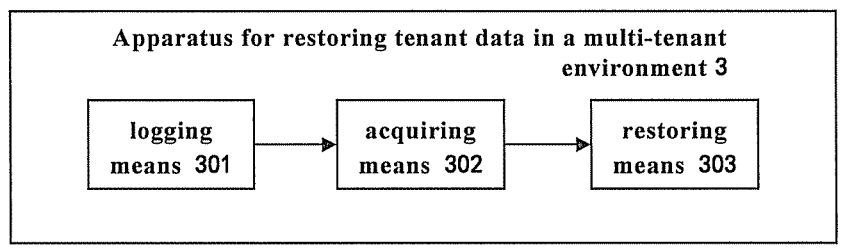
FIG. 4 is a block diagram showing an apparatus for restoring tenant data in a multi-tenant environment according an aspect of the invention.
Figure 5:
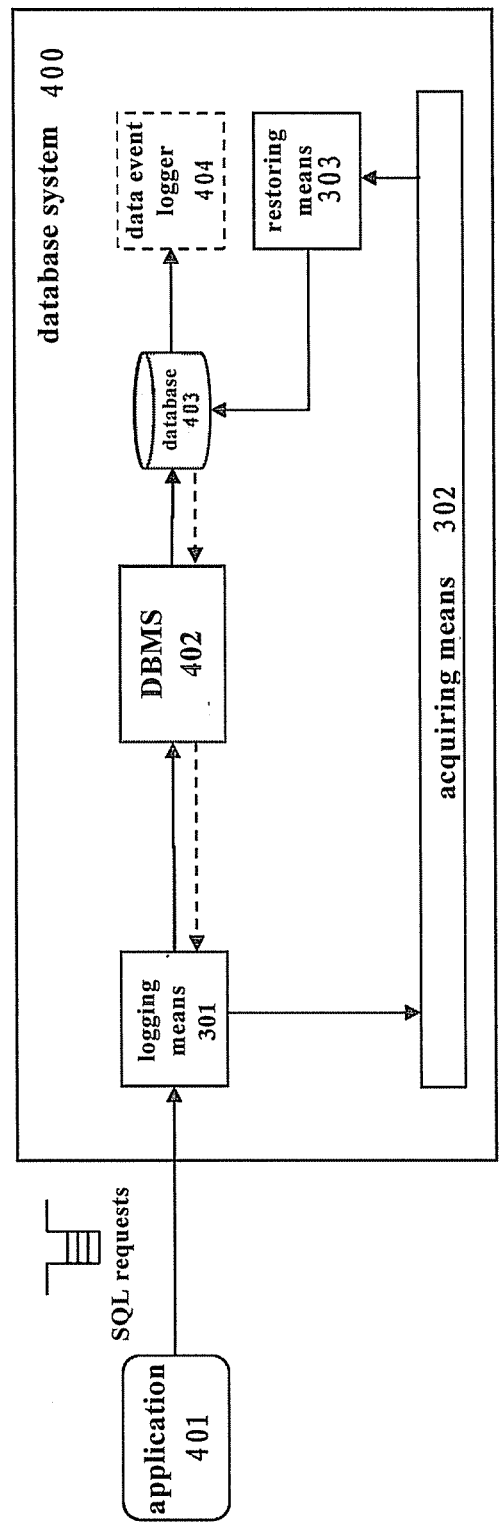
FIG. 5 shows a detailed block diagram according to an embodiment of the invention.
Figure 6:
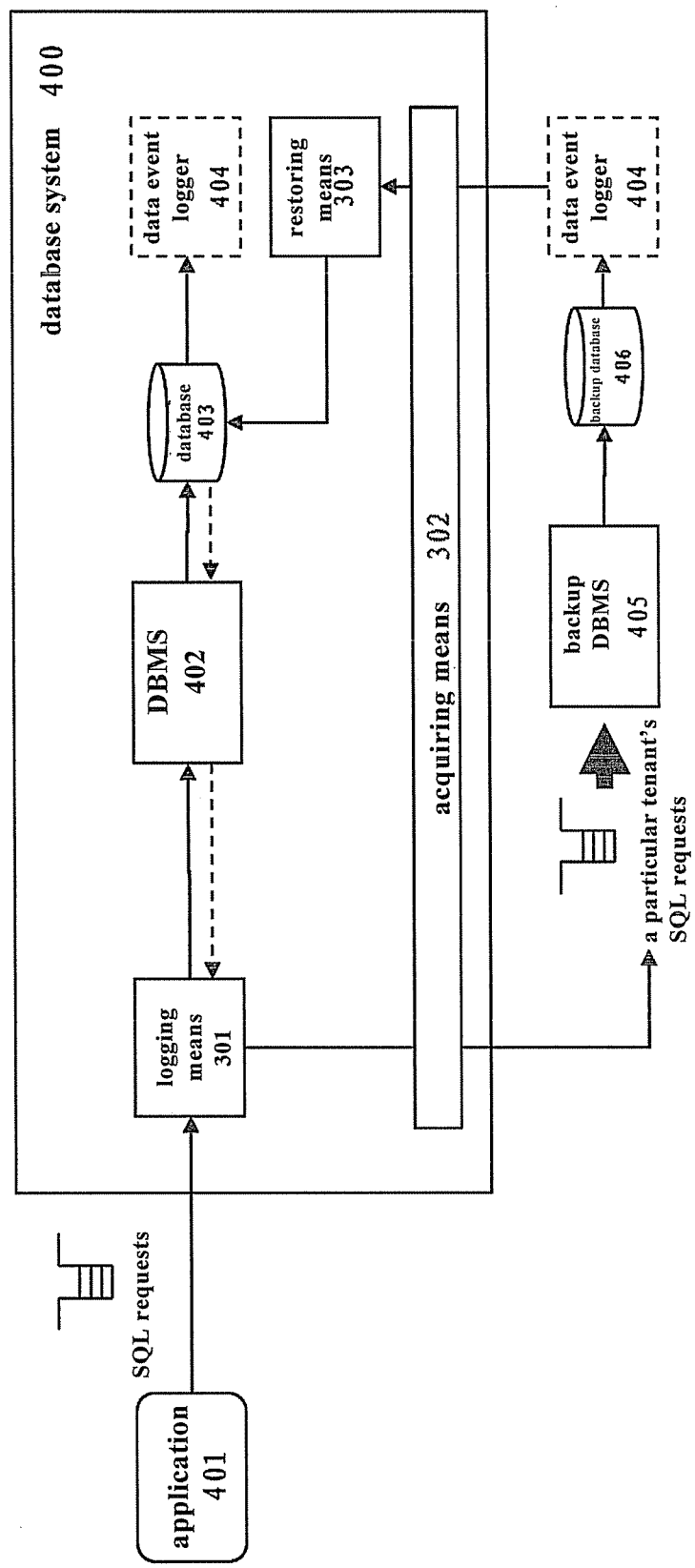
FIG. 6 shows a detailed block diagram according to another embodiment of the invention.

As shown in FIG. 4, an illustrative apparatus 3 for restoring tenant data in a multi-tenant environment according to an embodiment of the invention comprises: logging means 301 configured to log a plurality of tenants' requests to the database; acquiring means 302 configured to acquire, with respect to a particular tenant who requires restoring tenant data, a log of events which affect contents of the database and start from a particular backup point; and restoring means 303 configured to only restore in the database data of the particular tenant to the particular backup point, according to the acquired log of events. As shown in FIGS. 5 and 6, the logging means 301, acquiring means 302 and restoring means 303 are deployed outside the database management system 402 and the database 403, so this illustrative embodiment for restoring tenant data in a multi-tenant environment is a non-intrusive structure, which will not affect the operations of the database management system 402 and the database 403, but at the same time it implements the functionality of restoring data of a particular tenant without affecting other tenants.

Although FIG. 4 shows signal flows in the logging means 301, the acquiring means 302 and the restoring means 303 in manner of arrows, the flows are merely illustrative. Those skilled in the art benefited from the teaching of the present disclosure will understand that other connection modes can be used.

FIG. 5 shows a detailed block diagram according to an embodiment of the invention. The database system 400 of FIG. 5 comprises, in addition to the database management system 402, the database 403 and the attached data event logger 404, the apparatus for restoring tenant data in a multi-tenant environment, namely, the logging means 301, the acquiring means 302 and the restoring means 303.

Since the SQL requests logged by the logging means 301 contain tenant information, the acquiring means 302 extracts from a plurality of tenants' requests to the database starting from a particular backup point, requests which are from particular tenants who require restoring tenant data and affect the contents of the database (i.e., insertion, deletion and update requests). Then, the acquiring means 302 analyzes changes in the database caused by applying the extracted requests to the database 403. If an insertion request is applied, a new record generated after the insertion is determined and logged. If a deletion request is applied, a deleted record is determined and logged. If an update request is applied, updated records are determined and records before and after the update are logged.

Optionally, the restoring means 303 restores the data by applying to the database a reverse operation of the operation associated with the log of events acquired by the acquiring means 302. For example, if the operation associated with the log of events acquired is an insertion operation, the reverse operation of the operation associated with the log of events acquired is a deletion operation; if the operation associated with the log of events acquired is a deletion operation, the reverse operation of the operation associated with the log of events acquired is an insertion operation; if the operation associated with the log of events acquired is an update operation, the reverse operation of the operation associated with the log of events acquired is a reverse-update operation. Of course, the restoring means 303 can restore data by other manners known to those skilled in the art.

When restoring the data, it should be firstly determined which record in the database 403 is associated with the log of events acquired by the acquiring means 302, and then a reverse operation can be applied. This can be implemented by a Primary key. A Primary key is designated in the database for uniquely identifying a record in the database. When applying to the database a reverse operation of the operation associated with the log of events acquired, the database is searched for records with the same Primary key, according to the Primary key in the acquired log of events. The Primary key can be a single Primary key for uniquely identifying a record, e.g., "student number" which is unique to each of different students. The Primary key can be a plurality of combined Primary keys for collectively and uniquely identifying a record, e.g. "name"+"date of birth".

Of course, besides the manner of Primary key, those skilled in the art could use other manners such as complete match one by one, match by similarity, or the like.

In a second embodiment of the invention, a particular tenant does not wish to cancel out effects of all the operations of the particular tenant on the database starting from a particular backup point, but wishes to cancel out only effects on some items in the database, that is, restoring some items of the particular tenant in the database to the state at the particular backup point but keeping other items of the particular tenant in the database unchanged.

The second embodiment still uses the block diagram of FIG. 5. The second embodiment differs from the first embodiment in that, after the acquiring means 302 extracts from the plurality of tenants' requests to the database starting from the particular backup point the particular tenant's requests affecting the contents of the database, it further extracts from the particular tenant's requests affecting the contents of the database requests directed to some items in the database. Then the acquiring means 302 analyzes changes in the database caused by applying to the database the extracted requests directed to some items in the database, to generate the log of events. That is to say, the acquiring means 302 does not analyze changes in the database caused by applying to the database all the particular tenant's requests affecting the contents of the database starting from the particular backup point, but analyzes only changes in the database caused by applying to the database the requests directed to some items in the database.

Other portions of the second embodiment are similar to those of the first embodiment.

FIG. 6 shows a detailed block diagram according to a third embodiment of the invention. The third embodiment differs from the first embodiment in that the third embodiment does not analyze what changes in the database will be caused by applying the extracted requests to the database 403. It applies the particular tenant's requests to the database starting from the particular backup point to a backup database 406 via a backup database management system 405. The backup database 406 backs up the data in the database 403 at respective backup points. In this way, by applying the particular tenant's requests to the database 403 to the backup database that backs up the data at the particular backup points, the data event logger 404 attached to the backup database 406 can log the log of events of the particular tenant that affect the contents of the database 403 and start from the particular backup point.

Since the third embodiment uses the backup database that stores the same data as the database 403 at the backup point and the attached data event logging mechanism, it can automatically obtain the log of all events of the particular tenant starting from the particular backup point and affecting the contents of the database, without a complex analyzing process, thereby improving processing efficiency.

Other portions of the third embodiment are similar to those of the first embodiment.

An implementation of the third embodiment is illustrated below by way of example.

For example, the contents of the database 403 at the backup point B are listed as follows:

| Name | Student number | Date of birth | Score |
|---|---|---|---|
| ZHANG SAN | 5 | 1990/7/16 | 78 |
| LI SI | 8 | 1989/7/16 | 87 |
| WANG WU | 17 | 1990/1/23 | 54 |

It is assumed that there are three tenants A, B and C. Data of both ZHANG SAN and WANG WU belong to the tenant A; the tenant B temporarily has no data; the data of LI SI belongs to the tenant C.

After the backup point B, the following record is added to the tenant A:

| ZHAO LIU | 25 | 1990/5/12 | 92. |
|---|---|---|---|

Therefore, the data of ZHAO LIU also belongs to the tenant A.

In addition, the tenant A amends the record of

| ZHANG SAN | 5 | 1990/7/16 | 78 |
|---|---|---|---| to:

| ZHANG QI | 5 | 1990/7/16 | 78. |
|---|---|---|---|

After the backup point B, the following record is added by the tenant B:

| WANG WU | 28 | 1990/12/21 | 83. |
|---|---|---|---|

Here, the data of WANG WU belongs to the tenant B.

After the backup point B, the following record is deleted by the tenant C.

| LI SI | 8 | 1989/7/16 | 87. |
|---|---|---|---|

The current contents of the database 403 become:

| Name | Student number | Date of birth | Score |
|---|---|---|---|
| ZHANG QI | 5 | 1990/7/16 | 78 |
| WANG WU | 17 | 1990/1/23 | 54 |
| ZHAO LIU | 25 | 1990/5/12 | 92 |
| WANG WU | 28 | 1990/12/21 | 83. |

Now, since the tenant A has a wrong operation on the database, he wishes to roll back to the backup point B, but the tenants B and C do not wish the rollback.

The acquiring means 302 extracts from a plurality of tenants' SQL requests after the backup point B the above two requests of the tenant A and applies them to the backup database 406. The data event logger 404 attached to the backup database 406 records the following events:

(1) added: "ZHAO LIU 25 1990/5/12 92"; and (2) updated: from "ZHANG SAN 5 1990/7/16 78" to "ZHANG QI 5 1990/7/16 78".

Primary keys are set to "Name" and "Date of birth".

Firstly, the restoring means 303 finds out a corresponding record in the database 403 according to event of "ZHAO LIU 1990/5/12" in the event (1) and deletes it.

The current contents of the database 403 become:

| Name | Student number | Date of birth | Score |
|---|---|---|---|
| ZHANG QI | 5 | 1990/7/16 | 78 |
| WANG WU | 17 | 1990/1/23 | 54 |
| WANG WU | 28 | 1990/12/21 | 83. |

Then, the restoring means 303 finds out a corresponding record in the database 403 according to "ZHANG QI 1990/7/16" in the event (2) and reversely replaces it. The database 403 becomes:

| Name | Student number | Sate of birth | Score |
|---|---|---|---|
| ZHANG SAN | 5 | 1990/7/16 | 78 |
| WANG WU | 17 | 1990/1/23 | 54 |
| WANG WU | 28 | 1990/12/21 | 83. |

In this way, the data of the tenant A has been restored to the backup point without affecting the data of the tenant B and C.

According to another aspect of the invention, a computer program product is provided, comprising: an input/output device; a storage in which computer program instructions are stored; a processor configured to execute the computer program instructions stored in the storage so as to: log a plurality of tenants' requests to the database; with respect to a particular tenant who requires restoring tenant data, acquire a log of events which affect contents of the database and start from a particular backup point; and only restore in the database data of the particular tenant to the particular backup point, according to the acquired log of events.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining both software and hardware aspects that may all generally be referred to herein as a "circuit," "module" or "system." Furthermore, embodiments of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer usable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A method of restoring tenant data in a multi-tenant environment, comprising:
   logging a plurality of tenants' requests to a database;
   with respect to a particular tenant who requires restoring tenant data, extracting from a plurality of tenants' requests to the database starting from a particular backup point, the particular tenant's requests affecting the contents of the database and analyzing changes in the database caused by applying to the database the extracted particular tenant's requests affecting the contents of the database, to generate a log of events wherein a Primary key is designated in the database for uniquely identifying a record in the database and comprises a plurality of combined Primary keys; and
   restoring only data in the database of the particular tenant to the particular backup point, by searching the database for records with the Primary key, and applying to the database a reverse operation of an operation associated with the log of events generated, according to the Primary key in the generated log of events.

2. The method according to claim 1, wherein the reverse operation of the operation associated with the log of events acquired comprises:
   if the operation associated with the log of events acquired is an insertion operation, the reverse operation of the operation associated with the log of events acquired is a deletion operation;
   if the operation associated with the log of events acquired is a deletion operation, the reverse operation of the operation associated with the log of events acquired is an insertion operation; and
   if the operation associated with the log of events acquired is an update operation, the reverse operation of the operation associated with the log of events acquired is a reverse-update operation.

3. An apparatus for restoring tenant data in a multi-tenant environment, comprising:
   logging means configured to log a plurality of tenants' requests to the database;
   acquiring means configured to, with respect to a particular tenant that requires restoring tenant data, extract from a plurality of tenants' requests to the database starting from a particular backup point, the particular tenant's requests affecting the contents of the database and analyze changes in the database caused by applying to the database the extracted particular tenant's request affecting the contents of the database, to generate a log of events wherein a Primary key is designated in the database for uniquely identifying a record in the database and comprises a plurality of combined Primary keys; and
   restoring means configured to, restore only data in the database of the particular tenant to the particular backup point, to search the database for records with the Primary key, and apply to the database a reverse operation of the operation associated with the log of events generated according to the Primary key in the generated log of events.

4. The apparatus according to claim 3, wherein the reverse operation of the operation associated with the log of events acquired comprises:
   if the operation associated with the log of events acquired is an insertion operation, the reverse operation of the operation associated with the log of events acquired is a deletion operation;
   if the operation associated with the log of events acquired is a deletion operation, the reverse operation of the operation associated with the log of events acquired is an insertion operation; and
   if the operation associated with the log of events acquired is an update operation, the reverse operation of the operation associated with the log of events acquired is a reverse-update operation.

* * * * *